July 8, 1952 R. S. BRAUMILLER 2,602,345
CHAIN LINK AND CHAIN DEVICE FORMED THEREWITH
Filed Oct. 7, 1947 2 SHEETS—SHEET 1
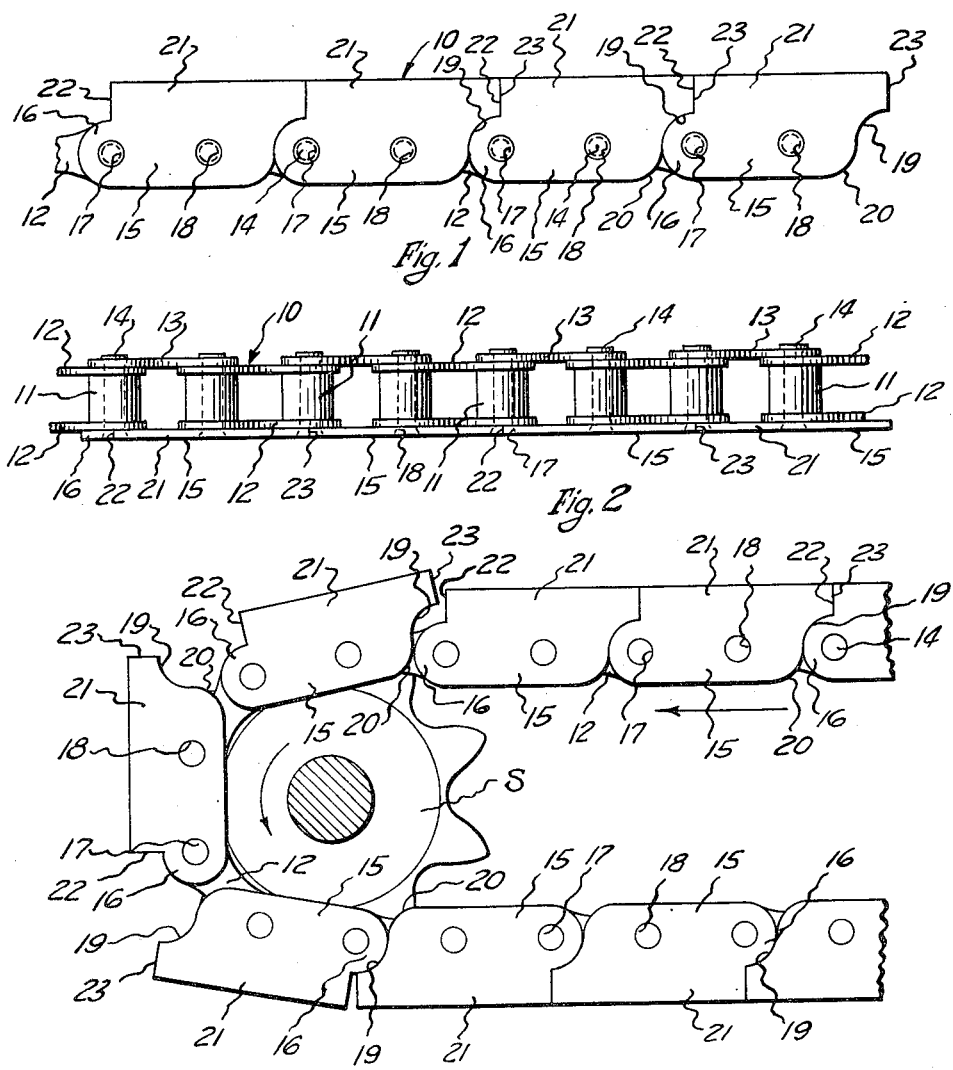
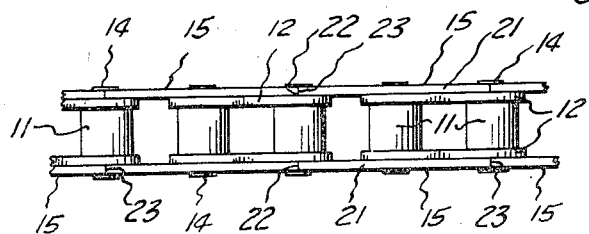
RAYMOND S. BRAUMILLER
INVENTOR.
BY
ATTORNEY July 8, 1952  R. S. BRAUMILLER  2,602,345
CHAIN LINK AND CHAIN DEVICE FORMED THEREWITH
Filed Oct. 7, 1947  2 SHEETS—SHEET 2

RAYMOND S. BRAUMILLER
INVENTOR.

BY

ATTORNEY

Patented July 8, 1952

2,602,345

UNITED STATES PATENT OFFICE 2,602,345

CHAIN LINK AND CHAIN DEVICE FORMED THEREWITH

Raymond S. Braumiller, Dallas, Tex.

Application October 7, 1947, Serial No. 778,334

6 Claims. (Cl. 74—251)

This invention relates to new and useful improvements in chain links and chain devices formed therewith.

One object of the invention is to provide an improved side link adapted to be incorporated in and used with standard roller-type chains to provide a chain section which is rigid and self-supporting against thrust in one direction but which permits flexing of the chain in the opposite direction.

Another object of the invention is to provide a chain side link of the character described which is so constructed that the chain in which the link is incorporated will flex or roll around the smallest sprockets upon which ordinary roller-type chain of the same size will operate.

A particular object of the invention is to provide a chain side link of the character described which is so arranged that vertical and end thrust upon any one link of a chain having the side links of the invention incorporated therein will be transmitted to a plurality of adjacent links and thus distributed over a substantial part of the chain, to provide a substantially rigid, self-supporting length of chain.

Still another object of the invention is to provide a chain having links of the character described incorporated therein and wherein the side links are adapted to be provided with extension members such as cutter blades, load conveyor elements or the like, whereby the chain may be used in hedge cutters or the like, conveyors and elevating machinery.

Another object of the invention is to provide improved chain side links of the character described which are adapted to be incorporated on both sides of a roller-type chain to further rigidify the chain and provide for the mounting of conveyor elements and the like; said chain having the side links incorporated therein being sufficiently flexible to roll around the smallest sprockets on which regular roller-type chain of the same size may be used.

A further object of the invention is to provide a cutting device having a chain with links of the character described incorporated therein, said links being provided with cutter blade extensions with cutter teeth on the cutting device, coacting with cutter teeth on the cutting device, whereby the device may be used as a hedge trimmer or the like.

A still further object of the invention is to provide a chain having incorporated therein links of the character described in combination with guide bars for the rollers of the chain, whereby lateral or end thrusts upon the extension members of the side links are transmitted to a plurality of the rollers to cause such plurality of rollers to engage the guide bars to distribute the load over a substantial length of the chain and guide bars.

Additional objects and advantages of the invention will readily be apparent from the reading of the following description of a device constructed in accordance with the invention, and reference to the accompanying drawings thereof, wherein:

Figure 1 is a side elevation of a chain having a plurality of links constructed in accordance with the invention incorporated therein;

Figure 2 is a plan view of the chain of Figure 1,

Figure 5:
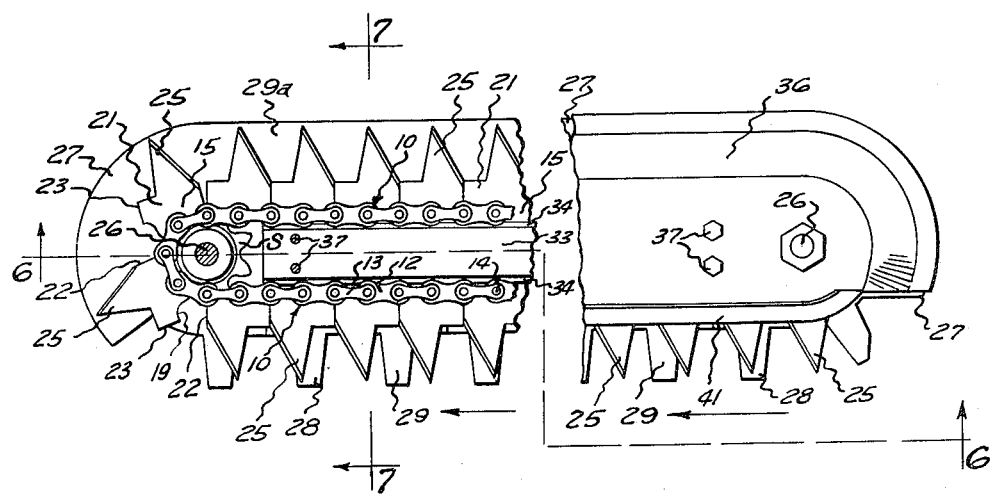
Figure 6:
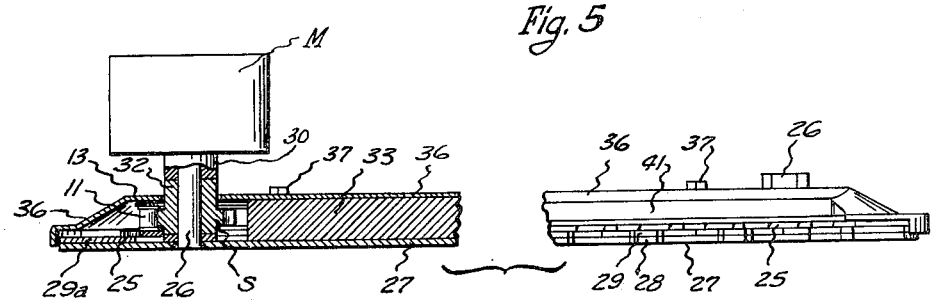
Figure 7:
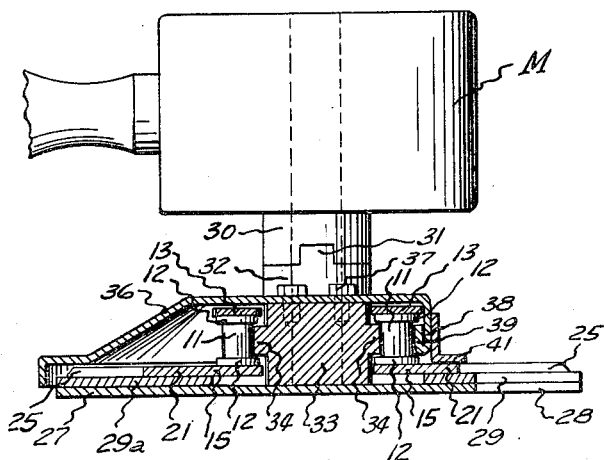

Figure 3 is a side elevation of the chain with the side links incorporated therein and showing the chain traveling around a sprocket, Figure 4 is a plan view of a modified chain having side links constructed in accordance with the invention incorporated on each side of the chain, Figure 5 is a view partly in elevation and partly in section of a cutting device having a chain with links constructed in accordance with the invention incorporated therein and having cutter extension members formed thereon, Figure 6 is a view taken on the line 6—6 of Figure 5, and Figure 7 is an enlarged transverse vertical sectional view taken on the line 7—7 of Figure 5.

In the drawings, the numeral 10 designates a roller-type chain having a plurality of cylindrical roller members 11, spaced apart by alternate inner side bars 12 and outer side bars 13. Rivet pins 14 extend through openings formed in the ends of the side bars 12 and 13 and through axial openings in the rollers 11 for pivotally connecting the side bars and rollers and providing an axle or shaft upon which the rollers may rotate. The foregoing is the usual and customary roller-type chain construction.

In carrying out the invention, however, the outer side bars 13 on one side of the chain are removed and special side links 15 are substituted therefor. Each side link 15 is formed with a semi-circular projecting nose 16 having a radius substantially equal to the radius of the inner side bar of the chain to which it is attached. A forward rivet pin opening 17 is formed in the side link in a position concentric with the semi-circular projecting nose portion thereof, and a rear rivet pin opening 18 is formed in the side link in longitudinal alignment with the forward opening 17 and spaced from such forward opening a distance equal to the pitch of the chain, or the distance between the rivet pins 14 of the chain on which the link is to be used. The rivet pins 14 extend through the openings 17 and 18, and the side link is thus connected in the chain to replace and serve the same purpose as the outer side bars 13 which were removed.

The length of each side link 15 is approximately twice the pitch of the chain, or twice the distance between the rivet pins 14, plus the length of the projecting nose 16. The rear of each link is cut away, as clearly shown in Figure 1, to provide a concave quadrant engaging surface 19 which projects rearwardly over and is arranged to engage with the projecting nose portion 16 of the next rearward link when the chain is in the position illustrated in Figure 1. The lower portion of the rear end of the link is cut away or relieved to form a convex cut away 20 which permits the link to clear the nose of the next rearward link when the chain is flexed in the manner illustrated in Figure 3.

Each side link 15 is provided with an upward extension or projection 21, having forward and rear edges which extend vertically to the longitudinal axis of the link. The forward edge or vertical abutting surface 22 of each extension is in substantially vertical and radial alignment with the forward rivet pin opening 17. The rear edge or abutting surface 23 of the projection extends parallel to the forward abutting surface, and is positioned so as to be in substantially vertical radial alignment with the center of the forward nose opening 17 of the next rearward side link, as clearly shown in Figure 1. The extensions or projections 21 may be extended or shaped in any form desired; as, for example, cutter teeth such as are shown in Figure 5, saw teeth, conveyor or elevator elements, or the like.

With the chain and side links 15 extending between sprocket wheels S, the side links will assume the position shown in Figure 1. In such position, the concave engaging surface 19 at the rear of each side link engages over and contacts the protruding nose portion 16 of the next successive rearward link, and the rear vertical abutting surface 23 engages and abuts against the forward vertical abutting surface 22 of the next rearward link. Any force applied longitudinally rearward or vertically downwardly of the chain side links will not cause the chain to flex, because of the engagement of the concave engaging surface 19 with the nose 16 of the next rearward link and because of the abutting engagement of the forward edge surface 22 of each link with the rear edge 23 of the adjacent link. Thus, a roller-type chain, having incorporated therein the special side link of the invention, provides a substantially rigid, self-supporting length of chain which cannot be flexed downwardly or "kinked" longitudinally.

However, since the side link pivots about the rear rivet pin opening 18 when the chain is flexed in the opposite direction, as when the chain travels around a sprocket wheel S in the manner shown in Figure 3, the concave quadrant engaging surface 19 lifts away from the protruding nose portion 16 of the next rearward link and the rear edge 23 of the projection 21 on the link is moved away from the forward edge 22 of the projection 21 of the next rearward link. The inner side bars 12 of the roller-type chain may pivot in the usual manner between the forward rivet pin opening 17 of one side link and the rear rivet pin opening 18 of the next forward side link, whereby the chain will flex readily in such opposite direction and may roll around the smallest sprocket upon which ordinary roller-type chain of the same size will operate.

From the foregoing, it will be seen that a chain link has been provided which, when incorporated in a roller-type chain in the manner just described, will provide a chain which is substantially rigid and self-supporting against deflection in one direction but which may be flexed readily and extensively in the opposite direction.

It will further be noted that the rear abutting edge 23 of each side link will tend to dissipate any sudden shock or load of thrust in a longitudinal direction, applied to any one of the side links, by transmitting or transferring a portion of such shock or load to the next rearward side link, which in turn transfers a portion to the side link next to the rear of it. Any thrust or load on the side links is thus dissipated or distributed over a substantial portion of the chain.

Manifestly, the outer side bars 13 may be removed from both sides of the roller-type chain and the special side links 15 substituted therefor on both sides of the chain, as shown in Figure 4. In such event, the chain having the side links so incorporated therein on both sides is even more rigid against deflection in one direction but is nevertheless readily flexible in the opposite direction. Furthermore, by providing the side links on both sides of the chain, conveyor members or elevator elements may be attached between the side links to provide a very rigid self-supporting conveyor chain. Such a chain need not be supported against vertical or longitudinal thrust in one direction between the sprockets S on which it is mounted, yet will readily roll or flex around the smallest sprocket on which a roller-type chain of the same size can be used.

The side links of the invention may be readily incorporated in standard roller-type chain to provide the rigid self-supporting chain of the invention at a relatively low cost and without affecting the operating characteristics of the roller-type chain. Manifestly, all parts of the roller-type chain other than the side links remain unaltered, whereby standard roller-type chain parts may be used and the chain will travel and work on standard roller-type chain sprockets. Furthermore, should the user desire to provide a guide or support bar beneath the rollers of the chain, the chain will travel along such guide or support bar with minimum friction and drag since the rollers 11 will turn or roll along such guide or support bar.

As has already been stated, a chain having the side links constructed in accordance with the invention and having cutter knives 25 formed on the outer portion of the extension or projection 21 of the side links 15 may be incorporated in a cutting device, such as a hedge trimmer, grass shear, or the like.

Such a cutting device is illustrated in Figures 5 through 7 inclusive, wherein a roller-type chain 10, having the side links 15 provided with cutter blades 25, is mounted between a pair of spaced sprockets S at opposite ends of the cutting device. The sprockets are rotatably mounted on shafts 26 which are secured in a vertical position near the ends of a base plate 27. One longitudinal edge of the base plate is provided with cut-away portions forming cutter teeth 28, past which the knife blades 25 of the chain side links are adapted to be moved rapidly, whereby limbs, twigs, grass and the like may be cut between the teeth 28 and the blades 25 in the usual manner.

The teeth on the base plate 27 may be integral with the base plate, or separate individual cutter teeth inserts 29 may be riveted or otherwise removably secured to the upper surface of the base plate. The removable inserts are the preferable construction, since hardened and ground cutting edges may be formed on the teeth inserts, and also individual teeth may be removed and replaced in case of wear, damage or breakage. A spacer plate 29a, having a thickness substantially equal to the thickness of the cutter teeth inserts, is mounted along the rear longitudinal edge of the base plate for guiding and supporting the chain 10 as it moves therealong.

A suitable motor M mounted on the cutting device has its drive shaft 30 connected by means of a key 31 to the hub 32 of one of the sprockets S for driving the sprocket and causing the chain to be moved in the direction of the arrow, or in a clock-wise direction. The motor may be electric, air-driven, or of the internal combustion or any other suitable type, and the driving connection between the motor and the sprocket may be other than that shown and just described.

An elongate supporting member 33 is mounted on the base plate 27 between the sprockets S and between the two lengths of chain. As is shown in Figure 7, this support member is provided with a longitudinally extending flange or rib 34 on each side, said rib being of such a thickness that it will engage the rollers 11 between the inner side bars 12 of the chain to aid in preventing inward deflection of the chain as the cutting device is used.

A cover plate 36 is removably secured to the upper surface of the support member 33 and covers the chain and sprocket wheels. As is clearly shown in Figure 7, the cover extends downwardly and outwardly, on the side of the cutting device opposite the cutting teeth 28, to a plane slightly above the knife blades 25 on the side links of the chain, and then extends outwardly past the edge of the base member 27 and is turned downwardly to fully protect the user of the cutting device from the knife blades 25 traveling on the rear side of the cutting device. The cover is held in place by cap screws 37 threaded through openings in the cover and into threaded recesses formed in the support member 33.

The front portion of the cover extends outwardly beyond the rollers and side bars of the roller chain, and is then turned downwardly parallel to the axis of the rollers of the chain to provide a protecting cover for the chain. The lower portion 38 of the cover is bent back inwardly and upwardly upon itself to provide an inwardly turned or directed guide rib 39 which is adapted to readily enter between the inner side bars of the chain and lie closely adjacent the rollers 11. An L-shaped protecting shoe 41 is secured to the downwardly turned portion 38 of the cover and extends outwardly just above the extensions or projections of the side links, terminating short of the cutter blades 25 formed on such extensions or projections. This protecting shoe is provided for preventing grass, or other trimmings, from entering the cover and becoming entwined or otherwise fouled in the rapidly rotating chain.

It has already been pointed out that a longitudinal or vertical thrust applied to the side links 15 of the chain will not cause substantial deflection of the chain, due to the engagement of the vertical abutting edges 22 and 23 of each link with the adjacent link and the engagement of the concave engaging surface 19 with the protruding nose of the next rearward link. Therefore, the thrust and shock load imparted or transmitted to the chain as twigs, grass and the like are cut between the knife blades 25 and the cutter teeth 28 will not deflect the chain inwardly, but the chain may readily flex around the sprocket wheels S.

Furthermore, any inward deflection of the roller-type chain, as the cutter blades strike and cut heavy twigs or limbs and the like, will be resisted by the elongate rib 34 on the support member 33, the engagement of the rollers 11 with said rib substantially eliminating any frictional drag as the chain moves along such rib. Also, such a thrust load on the knife blade tending to pivot any one of the side links about the rivet pin 14 will cause the rollers 11 to engage the flange 34 and the inwardly turned guide rib 39, whereby the chain and the side link cutter blade are positively held in operating position. Frictional drag, in such event, will be substantially eliminated, since the rollers 11 may turn readily in either direction on the rivet pins 14.

Due to the ability of the chain to flex or roll about the smallest sprocket wheels, the cutting device may be made very narrow from front to back. Since the chain is rigid and substantially self-supporting between the sprockets on the cutting face or side of the device, the length of the cutting device is not particularly limited and may be chosen suitable for hand hedge clipping, or machine mowing or the like. As will be seen in Figure 5, the knife blades 25 and cutter teeth 29 may be so spaced that at any given instant only a part of the blades and teeth are actually cutting, but the speed of rotation of the chain is such that the knife blades pass each of the cutter teeth sufficiently rapidly to assure cutting anything moved therebetween. Thus, the cutting shock or thrust is not applied simultaneously to all the teeth and blades but is rather applied intermittently to spaced blades and teeth.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A chain side link including, a body portion having openings therein by means of which the link may be secured in a chain, a protruding semi-circular nose portion at one end of the link positioned to be concentric with one opening in the body, a concave quadrant engaging surface at the opposite end of the body of a curvature substantially equal and complementary to the curvature of the protruding nose, said concave quadrant engaging surface having one end terminating on a line extending longitudinally of the link through the centers of the body openings of the link and having its center on an extension of said line at a point disposed rearwardly of the rear body opening a distance equal to the distance between the centers of said body openings, and an extension formed on one longitudinal edge of the body and having spaced opposed parallel abutment surfaces.

2. A roller-type chain side link including, an elongate body portion having a forward opening near one end for receiving a connecting pin whereby the link may be connected in a chain, a protruding semi-circular nose formed on the forward end of the link and concentric with the forward opening therein, said body having a rear opening disposed substantially centrally thereof in longitudinal alignment with the forward opening and adapted to receive a connecting pin for connecting the link in a chain, a rear portion of the link being cut away to form a concave quadrant engaging surface having a curvature substantially equal and complementary to the curvature of the nose of the link and adapted to engage the nose of the next succeeding link in a chain, said concave quadrant engaging surface having one end terminating on a line extending longitudinally of the links through the centers of the body openings of the link and having its center on an extension of said line at a point disposed rearwardly of the rear body opening a distance equal to the distance between the centers of said body openings, and an extension on one longitudinal edge of the link body having spaced parallel abutment surfaces disposed vertically to the longitudinal axis of the link and adapted to engage the opposite corresponding surfaces of adjacent links in a chain.

3. A roller-type chain side link including, an elongate substantially rectangular body portion having a forward opening near one end for receiving a connecting pin whereby the link may be connected in a roller-type chain and having a rear opening disposed substantially centrally thereof in longitudinal alignment with the forward opening and adapted to receive a connecting pin for connecting the link to the next successive roller in a roller-type chain, a protruding semi-circular nose portion formed on the forward end of the link and concentric with the forward opening therein, the rear portion of the link being cut away to form a concave quadrant engaging surface having a curvature substantially equal complementary to the curvature of the nose of the link and having one end of said concave quadrant engaging surface terminating on a line extending longitudinally of the link through the centers of the body openings of the link and having its center on an extension of said line at a point disposed rearwardly of the rear body opening a distance equal to the distance between the centers of said body openings, said concave quadrant engaging surface being thus positioned to engage the nose portion of the next succeeding link in a roller-type chain, whereby a downward or rearward longitudinal thrust on the chain side link is transmitted by said quadrant engaging surface to the nose portion of the next succeeding link in the chain, and an extension on one longitudinal edge of the link body having an abutment surface extending radially of the forward opening in the link and vertically to the longitudinal axis of the openings therein, said extension also having a rear abutment surface extending parallel to the forward abutment surface and spaced therefrom and disposed to extend radially of the forward opening of the next succeeding link in the chain.

4. In a roller-type chain having a plurality of cylindrical rollers rotatably mounted on connecting pins and inner side bars connecting successive pairs of pins and rollers and outer side bars connecting successive connected pairs of pins and rollers on one side of the chain, chain side links for connecting the successive connected pairs of pins and rollers on the opposite side of the chain from the outer side bars and each including, an elongate body portion having a forward opening near one end for receiving a connecting pin and a rear opening disposed substantially centrally of the body and in longitudinal alignment with the forward opening and adapted to receive the next successive connecting pin for connecting the link in the chain, a protruding semi-circular nose formed on the forward end of each link concentric with the forward opening therein, the rear portion of each link body being cut away to form a concave quadrant engaging surface having a curvature substantially equal and complementary to the curvature of the nose of the link and having one end of said concave quadrant engaging surface terminating on a line extending longitudinally of the link through the centers of the body openings of the link and having its center on an extension of said line at a point disposed rearwardly of the rear body opening a distance equal to the distance between the centers of said body openings, said concave quadrant engaging surface being thus positioned to engage the nose of the next succeeding link in the chain, and a projecting extension on one longitudinal edge of the link body having spaced parallel abutment surfaces disposed vertically to the longitudinal axis of the link and adapted to engage the opposite corresponding surfaces of the adjacent links in the chain, the engagement of the concave quadrant engaging surface with the nose of the next succeeding link and the engagement of the abutment surfaces with the opposite corresponding abutment surfaces of the adjacent links preventing flexing of the chain in one direction whereby a substantially rigid bar-like length of chain is provided for resisting force tending to flex the chain in such direction, the links being free to move relative to each other in the other direction to permit the chain to flex in such other direction.

5. In a roller-type chain having a plurality of cylindrical rollers rotatably mounted on connecting pins and inner side bars connecting successive pairs of pins and rollers, chain side links for connecting successive connected pairs of pins and rollers on each side of the chain and each including, an elongate body portion having a forward opening near one end for receiving a connecting pin and a rear opening disposed substantially centrally of the body and in longitudinal alignment with the forward opening and adapted to receive in the next successive connecting pin for connecting the link in the chain, a protruding semi-circular nose portion formed on the forward end of each link concentric with the forward opening therein, the rear portion of each link body being cut away to form a concave quadrant engaging surface having a curvature substantially equal and complementary to the curvature of the nose portion of the link and having one end of said concave quadrant engaging surface terminating on a line extending longitudinally of the link through the centers of the body openings of the link and having its center on an extension of said line at a point disposed rearwardly of the rear body opening a distance equal to the distance between the centers of said body openings, said concave quadrant engaging surface being thus positioned to engage the nose portion of the next succeeding link on that side of the chain, and a projecting extension on one longitudinal edge of each link body having a forward abutment surface disposed vertically to the longitudinal axis of the link and radially of the forward opening therein and having a rear abutment surface disposed vertical to the longitudinal axis of the link and adapted to extend radially of the forward opening of the next succeeding link on that side of the chain and to engage the forward abutment surface of the next succeeding link on that side of the chain, the engagement of the concave quadrant engaging surface of each link with the nose of the next link and the engagement of the abutment surfaces with the opposite corresponding abutment surfaces of the adjacent link preventing flexing of the chain in one direction whereby a substantially rigid bar-like length of chain is provided for resisting force tending to flex the chain in such direction, the links on both sides of the chain being free to move relative to each other in the other direction to permit the chain to flex in such other direction.

6. A roller-type chain side link including, an elongate substantially rectangular body portion having a forward opening near one end for receiving a connecting pin whereby the link may be connected in a roller-type chain and having a rear opening disposed substantially centrally thereof in longitudinal alignment with the forward opening and adapted to receive a connecting pin for connecting the link to the next successive roller in a roller-type chain, a protruding semi-circular nose portion formed on the forward end of the link and concentric with the forward opening therein, the rear portion of the link being cut away to form a concave quadrant engaging surface having a curvature substantially equal and complementary to the curvature of the nose of the link and having one end of said concave quadrant engaging surface terminating on a line extending longitudinally of the link through the centers of the body openings of the link and having its center on an extension of said line at a point disposed rearwardly of the rear body opening a distance equal to the distance between the centers of said body openings, said concave quadrant engaging surface being thus positioned to engage the nose portion of the next succeeding link in a roller-type chain, whereby a downward or rearward longitudinal thrust on the chain side link is transmitted by said quadrant engaging surface to the nose portion of the next succeeding link in the chain, and an extension on one longitudinal edge of the link body having an abutment surface extending radially of the forward opening in the link and vertically to the longitudinal axis of the openings therein, said extension also having a rear abutment surface extending parallel to the forward abutment surface and spaced therefrom and disposed to extend radially of the forward opening of the next succeeding link in the chain, the forward abutment surface being adapted to engage the rear abutment surface of the preceding link in a chain and the rear abutment surface being adapted to engage the forward abutment surface of the succeeding link in a chain, whereby a downward or rearward longitudinal thrust applied to the link from the side on which the extension is located is transmitted to the adjacent links to prevent flexing of the chain in which the links are used.

RAYMOND S. BRAUMILLER.

REFERENCES CITED

The following references are of record in the file of this patent:

UNITED STATES PATENTS

| Number | Name | Date |
|---|---|---|
| 1,000,949 | Rosean | Aug. 15, 1911 |
| 1,760,939 | Emerson | June 3, 1930 |
| 1,851,840 | Huff | Mar. 29, 1932 |
| 2,034,058 | Sacrey | Mar. 17, 1936 |
| 2,356,437 | Smith | Aug. 22, 1944 |